United States Patent
Santi (10) Patent No.: US 9,562,801 B2
(45) Date of Patent: Feb. 7, 2017

(54) WASTE BIN SCALE, LOAD CELL AND METHOD OF MEASURING A WASTE BIN LOAD

(71) Applicant: Larry D. Santi, Renton, WA (US)

(72) Inventor: Larry D. Santi, Renton, WA (US)

(*) Notice: Subject to any disclaimer, the term of this patent is extended or adjusted under 35 U.S.C. 154(b) by 134 days.

(21) Appl. No.: 14/213,758

(22) Filed: Mar. 14, 2014

(65) Prior Publication Data

US 2014/0262552 A1  Sep. 18, 2014

Related U.S. Application Data

(60) Provisional application No. 61/800,773, filed on Mar. 15, 2013.

(51) Int. Cl.
*G01G 3/14* (2006.01)
*G01L 1/22* (2006.01)
*G01G 19/08* (2006.01)

(52) U.S. Cl.
CPC .............. *G01G 3/14* (2013.01); *G01G 19/083* (2013.01); *G01L 1/22* (2013.01)

(58) Field of Classification Search
CPC ...... G01G 19/08; G01G 19/083; G01G 19/12; G01G 3/14; G01L 1/22
See application file for complete search history.

(56) References Cited

U.S. PATENT DOCUMENTS

| | | | |
|---|---|---|---|
| 2,935,213 A | 5/1960 | Cellitti et al. | |
| 3,724,575 A | 4/1973 | Kutsay | |
| 3,927,560 A | 12/1975 | Farr | |
| 4,326,424 A | 4/1982 | Koenig | |
| 4,421,186 A * | 12/1983 | Bradley | G01G 19/083 177/139 |
| 4,657,097 A | 4/1987 | Griffen | |
| 4,951,765 A | 8/1990 | Naito et al. | |
| 5,083,624 A | 1/1992 | Reichow | |
| 5,119,894 A * | 6/1992 | Crawford | B65F 1/1484 177/139 |
| 5,230,393 A * | 7/1993 | Mezey | B65F 3/08 177/139 |
| 5,245,137 A * | 9/1993 | Bowman | B65F 3/04 177/1 |
| 5,525,022 A * | 6/1996 | Huntoon | B65F 3/001 414/408 |
| 5,703,333 A * | 12/1997 | Wegner | G01G 19/12 177/139 |

(Continued)

FOREIGN PATENT DOCUMENTS

| | | |
|---|---|---|
| JP | 07260554 A | 10/1995 |
| JP | 2007008614 A | 1/2007 |
| WO | 2011/019265 A2 | 2/2011 |

*Primary Examiner* — Natalie Huls
(74) *Attorney, Agent, or Firm* — Seed IP Law Group LLP (57) ABSTRACT

A waste bin scale to measure a cantilevered load carried by lift members of a lift system. The waste bin scale includes a base coupleable to the lift system, a lift member support system; and a plurality of load cells. Each load cell is coupled between the base and the lift member support system, and includes a structural member configured to deform during application of a load applied by the waste bin, where the deformation is indicative of the applied load. Other related waste bin scales, load cells therefor and methods of measuring waste bin scale loads are also provided.

20 Claims, 9 Drawing Sheets

(56) References Cited

U.S. PATENT DOCUMENTS

| | | | | |
|---|---|---|---|---|
| 5,837,945 | A | * | 11/1998 | Cornwell .................. B65F 3/04 177/136 |
| 5,837,946 | A | * | 11/1998 | Johnson ............... G01G 3/1404 177/136 |
| 5,861,580 | A | * | 1/1999 | Moore ................. G01G 23/005 177/136 |
| 5,895,894 | A | * | 4/1999 | Zumbach ............... G01G 21/30 177/124 |
| 5,917,159 | A | * | 6/1999 | Kostiuk ............. G01G 23/3728 177/136 |
| 6,002,090 | A | | 12/1999 | Johnson et al. |
| 6,363,798 | B1 | | 4/2002 | Gitis et al. |
| 6,422,800 | B1 | * | 7/2002 | Reichow ............. G01G 19/083 177/136 |
| 6,910,392 | B2 | | 6/2005 | Lockery et al. |
| 7,009,118 | B2 | * | 3/2006 | Pottebaum ............. G01G 19/12 177/136 |
| 8,353,388 | B2 | | 1/2013 | Rice et al. |
| 2005/0132818 | A1 | * | 6/2005 | Simons ................ G01G 23/005 73/862.382 |
| 2011/0067502 | A1 | * | 3/2011 | Simons ................ B66F 17/003 73/862.045 |
| 2012/0175169 | A1 | * | 7/2012 | Siaw ........................ B66F 9/20 177/136 |
| 2014/0262550 | A1 | * | 9/2014 | Santi ..................... G01G 19/12 177/1 |
| 2015/0093216 | A1 | * | 4/2015 | Pangrazio ............ B66F 17/003 414/21 |

* cited by examiner

WASTE BIN SCALE, LOAD CELL AND METHOD OF MEASURING A WASTE BIN LOAD

TECHNICAL FIELD

The present disclosure is directed to waste bin scales, and more particularly, to waste bin scales including therein load cells to measure cantilevered loads applied with a high level of precision during handling of such waste bins.

DESCRIPTION OF THE RELATED ART

Various systems and related methods are known for measuring a cantilevered load. These systems typically include a scale assembly that is positionable between a lift member support system and a base plate, which may be coupled to a lift system or other manipulate system to move the load. Examples of such systems include forklift scales, which can be found in U.S. Pat. Nos. 4,421,186; 6,002,090; and 8,353,388, all of which are incorporated herein by reference in their entirety.

Existing systems and methods for measuring cantilevered loads, however, may suffer from a variety of drawbacks or deficiencies. For example, some systems are quite bulky and overly complex. In addition, some systems are prone to inaccuracies in the measured load when the position of the load varies.

BRIEF SUMMARY

The embodiments described herein provide waste bin scale systems (and other scale systems), load cells and related methods that are well adapted to measure loads in an accurate manner and in a compact and robust form factor. Further, the waste bin scale systems and load cells are particularly adapted to compensate for bending moments and end loads dynamically that may result during a waste bin handling operation.

According to one embodiment, a waste bin scale to measure a cantilevered load carried by lift members of a lift system may be summarized as including a base coupleable to the lift system; a lift member support system; and a plurality of load cells coupled between the base and the lift member support system. Each load cell may include a structural member having an aperture extending therethrough which defines at least one pair of offset strain gauge mounting surfaces that are parallel to a horizontal reference plane; and an arrangement of strain gauges to sense deformations at least at one or more locations on the at least one pair of offset strain gauge mounting surfaces.

According to another embodiment, a waste bin scale to measure a cantilevered load may be summarized as including separate scale units, each scale unit including a base coupleable to the lift system; a lift member support; and a load cell coupled between the base and the lift member support system. The scale units may be configured to collectively measure a cantilevered load.

According to another embodiment, a load cell of a waste bin scale for measuring at least a portion of a cantilevered load carried by lift members of a lift system may be summarized as including a structural member having at least one aperture extending therethrough that defines at least one pair of offset strain gauge mounting surfaces at each of opposing ends thereof that are parallel to a horizontal reference plane of the load cell; and an arrangement of strain gauges. The arrangement of strain gauges may be summarized as including a first bridge arrangement of strain gauges including one pair of strain gauges mounted on one of the parallel offset mounting surfaces located at one of the opposing ends of the load cell and including one pair of strain gauges mounted on one of the parallel offset mounting surfaces located at the other one of the opposing ends of the load cell; and a second bridge arrangement of strain gauges including one pair of strain gauges mounted on one of the parallel offset mounting surfaces located at one of the opposing ends of the load cell and one pair of strain gauges mounted on one of the parallel offset mounting surfaces located at the other one of the opposing ends of the load cell.

According to yet another embodiment, a method of measuring a load carried by a pair of lift members of a lift system configured to movably position the lift members may be summarized as including obtaining signals from an arrangement of strain gauges of each of a plurality of load cells that are positioned between the lift system and the lift members, wherein obtaining signals from each load cell includes obtaining, for each load cell, strain gauge signals from a respective first bridge arrangement of strain gauges mounted on parallel horizontal mounting surfaces located at each end of opposing ends of the load cell and obtaining strain gauge signals from a respective second bridge arrangement of strain gauges mounted on parallel mounting surfaces located at each of the opposing ends of the load cell; and processing the signals to obtain a load value indicative of a load shared by the pair of lift members. The method may further include determining a position of the load carried by the pair of lift members using various arrangements of strain gauges and adjusting the load value indicative of the load shared by the pair of members based on said determined position. The method may also include disabling or limiting movement of the lift members based on said determined position of the load.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and methods associated with scales and load cells may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

A conventional waste bin collection operation generally involves use of a waste bin collection truck. The waste bin collection truck may include a lifting arm system, which is operable by the waste bin collection truck operator. The lifting arm system may be extendable from the waste bin collection truck to engage a waste bin, whereby the waste bin is thereafter manipulable by the lifting arm system. The lifting arm system may lift the waste bin and retract towards a collection compartment, and then tilt the waste bin at an appropriate angle in order to dispose of its contents. Other variations of such waste bin systems are also known.

The waste bin collection mechanism may represent a cantilevered beam formation, whereby the gravitational load of the waste bin applies shear loads and bending moments to the lifting arm system. Thus, measuring the weight of the waste bins for efficient and safe transport of the same may be critical and is accomplished by embodiments described herein by utilizing force sensitive scales, which are capable of measuring the applied gravitational load of the waste bins (hereinafter "loads") resulting from operation of the waste bin collection mechanism in a dynamic manner during the handling operation. Further, in order to improve accuracy of the measurements, the bending moments and other end loads resulting from the cantilevered beam formation should be accounted for and rejected or compensated for in some manner.

Embodiments described herein provide waste bin scales and load cells that are well adapted to measure loads, with a high level of precision, and in a compact and robust form factor. Advantageously, the waste bin scales and load cells may be particularly easy to install and remove and can be scaled to provide a solution for a wide range of waste bin trucks.

Figure 1:
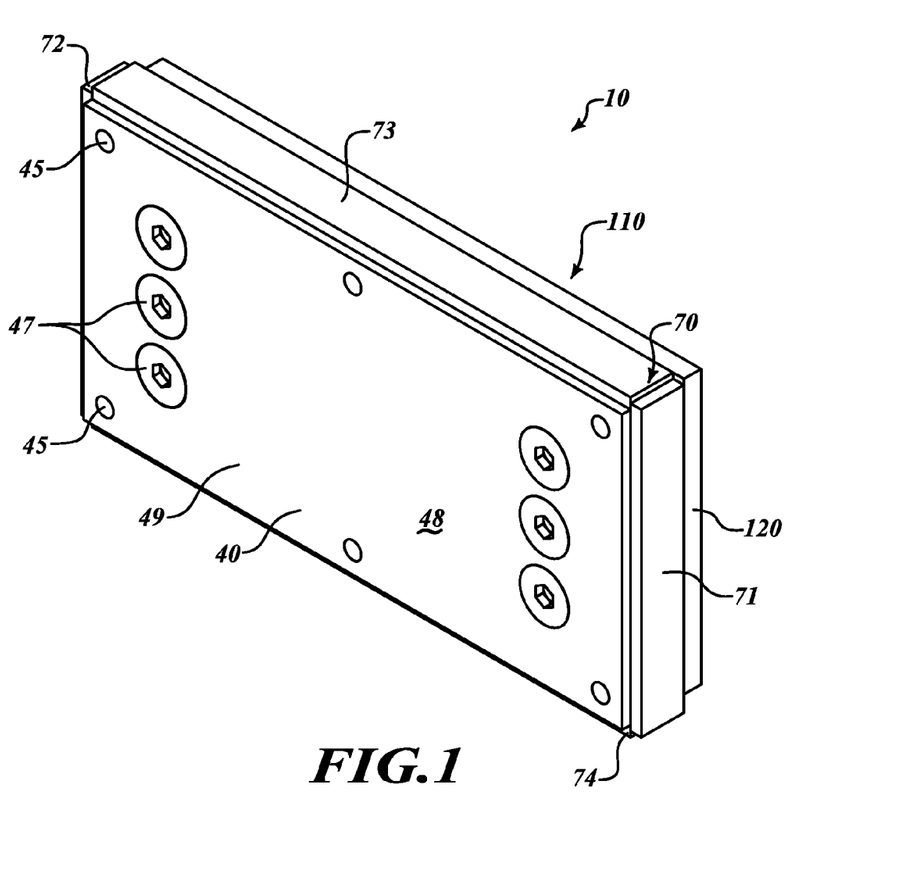
FIG. 1 is an isometric view of a waste bin scale, according to one embodiment, shown in an assembled condition and coupled to a portion of a lifting arm system.
Figure 2:
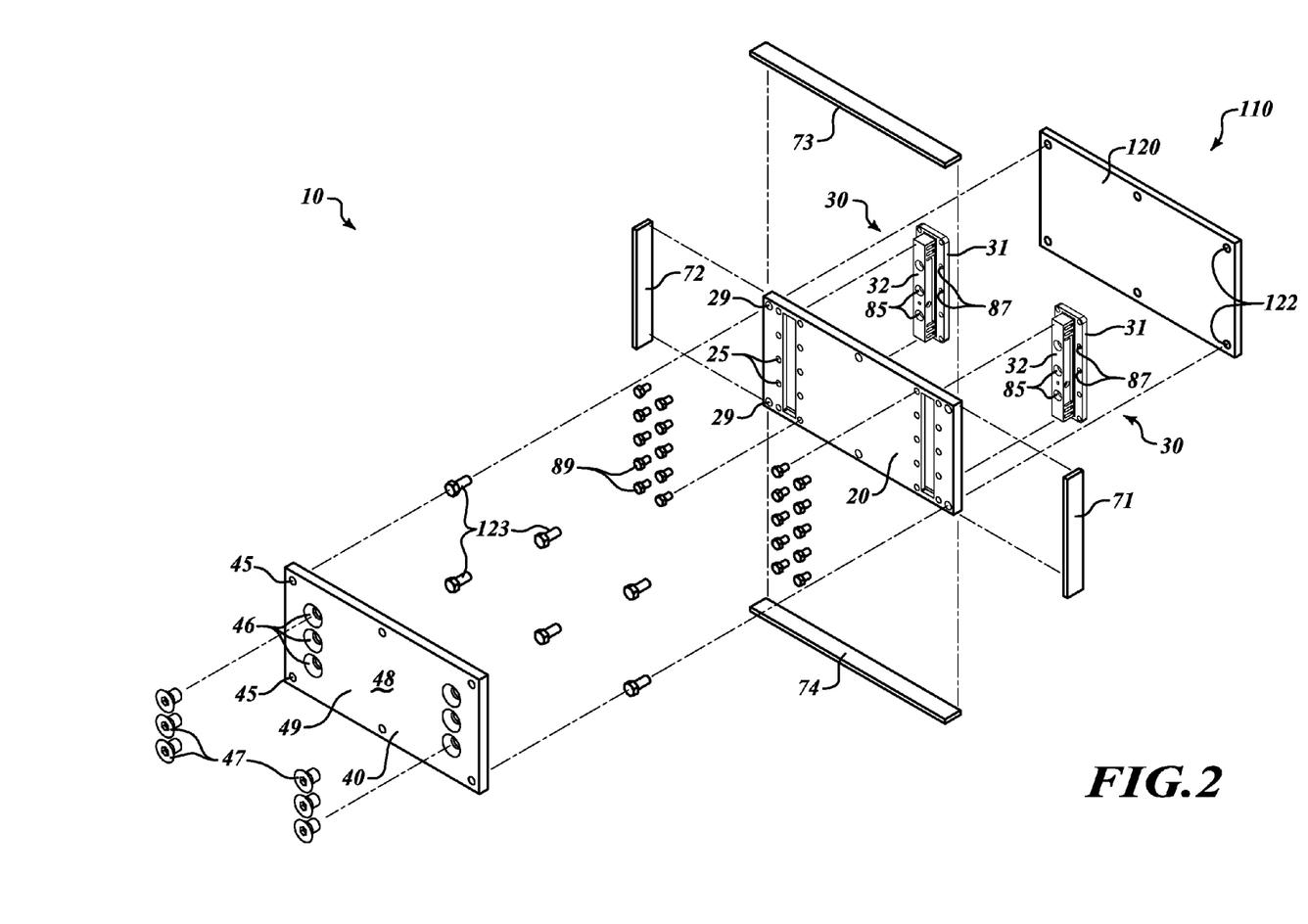
FIG. 2 is an exploded isometric view of the waste bin scale of FIG. 1, along with a mounting plate of the lifting arm system.
Figure 3:
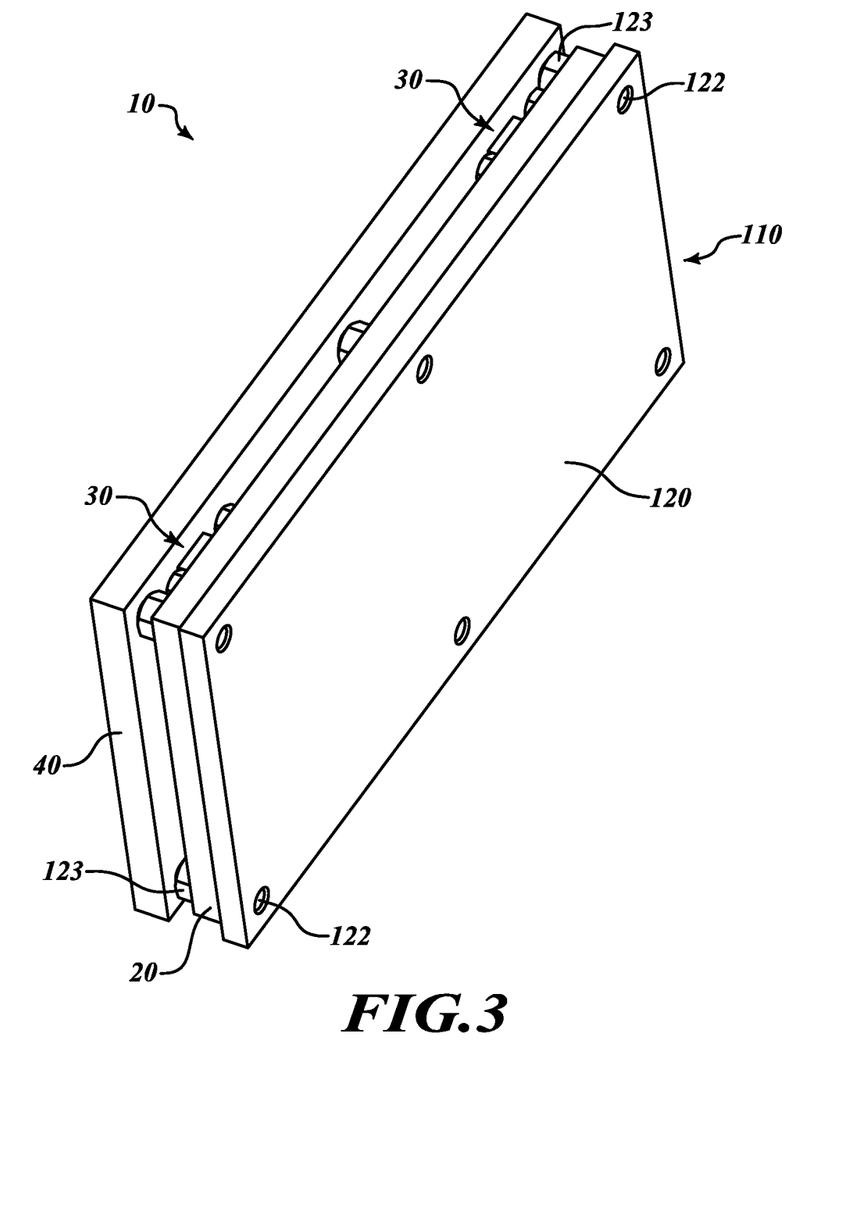
FIG. 3 is a skewed isometric rear view of the waste bin scale of FIG. 1 coupled to the portion of the lifting arm system, and with a skirt system thereof removed.

FIGS. 1-7 illustrate one example embodiment of a waste bin scale system 10, and sub-components thereof, that may be used with a waste bin collection truck. FIG. 1 shows the scale system 10 in an assembled condition from one perspective, FIG. 2 shows the scale system 10 in an exploded condition from the same perspective, and FIG. 3 shows the scale system 10 again in an assembled condition from a different perspective and with a skirt system 70 thereof removed.

With reference to FIG. 2, the waste bin scale system 10 includes a base plate 20 that is coupleable to a conventional lifting arm system 110, and more particularly a mounting plate 120 thereof. The mounting plate 120 may be, for example, connected to or otherwise form a portion of a waste bin collection truck. The mounting plate 120 may include a mounting arrangement of threaded apertures 122 or other features, which are coupleable to lift members (not shown), such as, for example, lifting arms adapted to interface with waste bins or the like for lifting the same. According to aspects of the embodiments described herein, the waste bin scale system 10 may take advantage of the mounting arrangement of threaded apertures 122 to mount the scale system 10 between the mounting plate 120 and lift members that would otherwise be connected directly to the mounting plate 120 in a conventional arrangement.

More particularly, the base plate 20 may be coupled to the mounting plate 120 of the lifting arm system via bolts 123 or other fasteners or fastening techniques. Further, the base plate 20 may also be adapted to couple to other available forms of the lifting arm support system, such that the loads of the waste bins are appropriately transferred to the waste bin scale system 10 for precise measurements.

With continued reference to FIG. 2, the waste bin scale system 10 further includes a lift member support system 40 that is coupleable to the base plate 20, with a pair of load cells 30 positioned therebetween. In other instances, the waste bin scale system 10 may be configured to accommodate any number of load cells 30. The lift member support system 40 may include an array of threaded apertures 45 or other features that replicate features of the mounting plate 120 to accept lift members in the same or similar manner that the mounting plate 120 would otherwise receive such lift members in the absence of the example scale system 10.

Figure 4:
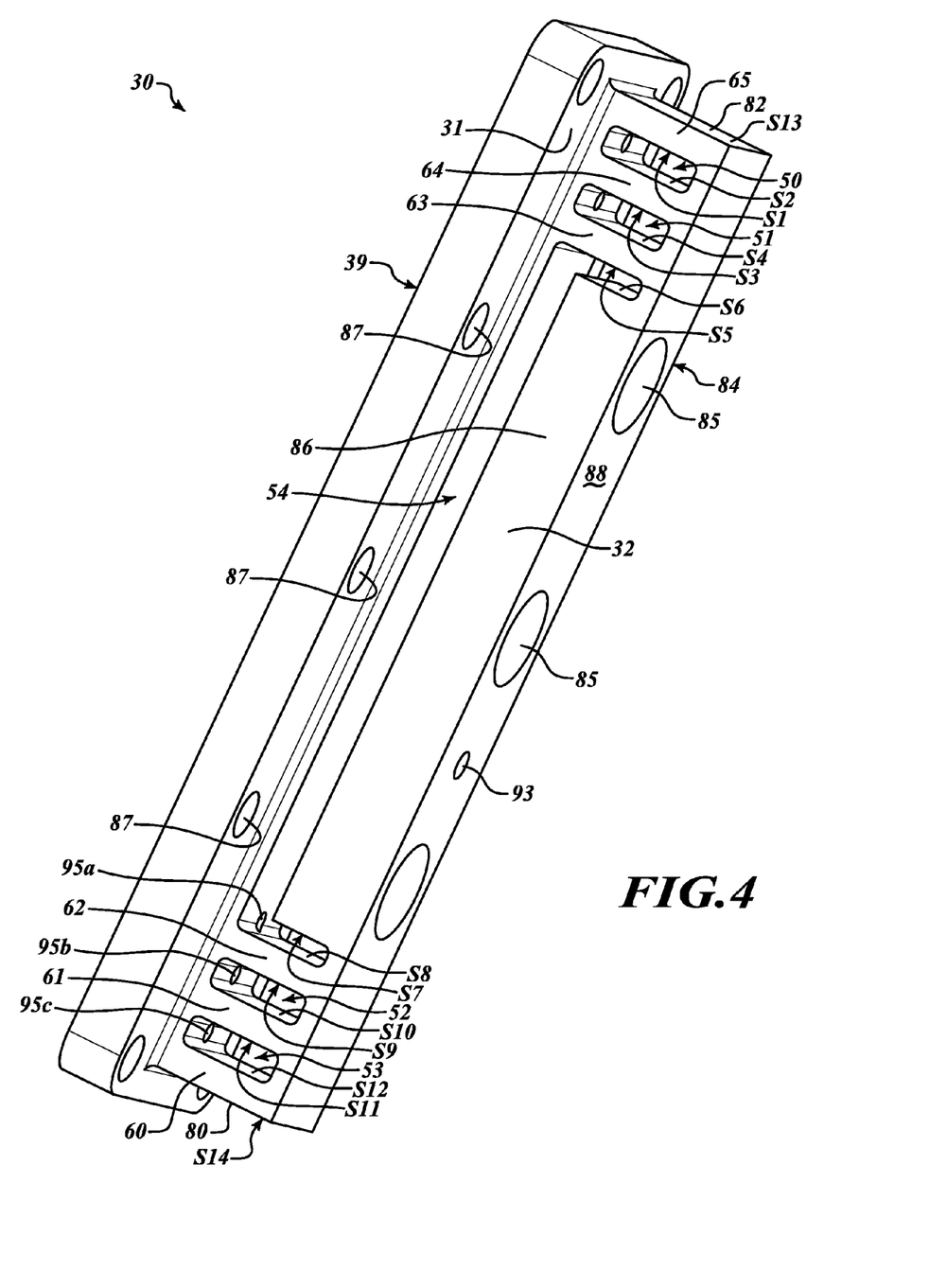
FIG. 4 is a skewed isometric view of a load cell, according to one embodiment, which is suitable for use with the scale of FIG. 1.
Figure 5:
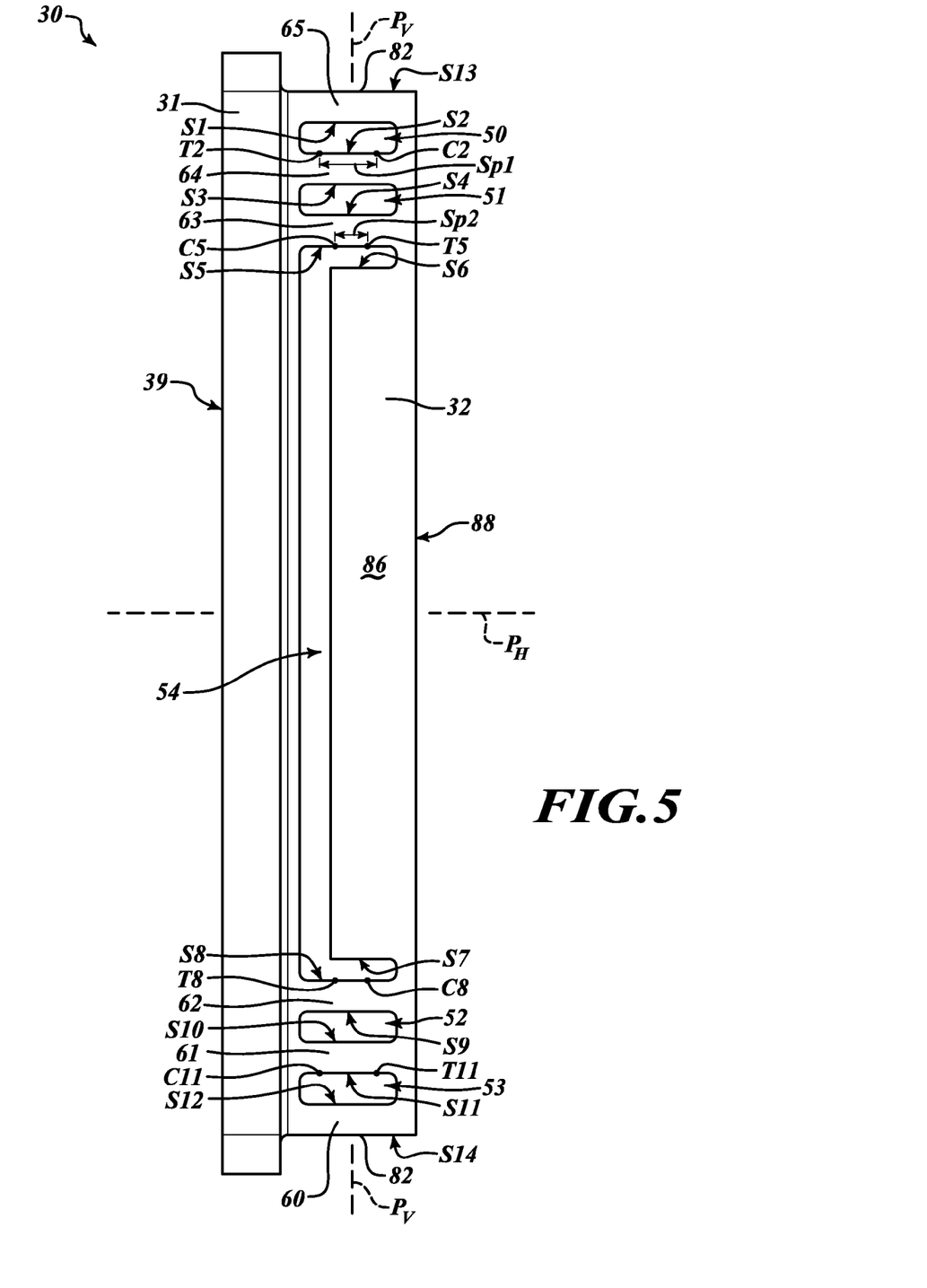
FIG. 5 is a side elevational view of the load cell of FIG. 4.

FIGS. 4 and 5 illustrate one example embodiment of the load cell 30 that may be used with the example waste bin scale system 10 described herein. The load cell 30 has an about T-shaped cross section with a base flange 31 and an upstanding flange that represents a structural member 32. While the shown embodiment of the load cell 30 has an about T-shaped cross-section, in other embodiments the load cell 30 may have an I-shaped cross section, a rectangular shaped cross-section, or may have a different shape cross-section. The structural member 32 of the example load cell 30, shown best in FIGS. 4 and 5, is shown welded to the base flange 31; however, it is appreciated that the load cell 30 may include a unitary body formed by casting, machining or other manufacturing processes, or may include a plurality of components fastened or otherwise assembled together. Various paths or passages, such as, for example, passages 37 shown in FIG. 7 and passages 93, 95a-c shown in FIG. 4, may be formed or otherwise provided in the load cells 30 to facilitate routing electrical conductors, such as cables or wires, between a control system or data collection system and strain gauges mounted on surfaces of the load cells 30 as described in greater detail below. The various passages and other cavities may be filled with potting material after the load cells 30 are appropriately wired to enhance robustness of the system.

With reference to the example embodiment of the waste bin scale system 10 and load cells 30 and other components thereof shown in FIGS. 1 through 7, the base flange 31 of each load cell 30 is coupled to the base plate 20 via fastening methods, described in further detail elsewhere. In other embodiments, other means of coupling the base flange 31 of each load cell 30 to the base plate 20 may also be used, such as welding or by the use of other engagement features.

With reference to FIGS. 4 and 5, the structural member 32 of each load cell 30 is the portion of the load cell 30 that elastically deforms upon application of the loads resulting from handling operations of the waste bins (or other items), where the amount of deformation is indicative of the applied loads. The structural member 32 of each load cell 30 includes a plurality of apertures 50-54 extending through the width of the structural member 32 that define respective thin-walled structures therebetween. One aperture 50 of the structural member 32 is located at a first end 82 of the structural member 32 and defines at least in part a thin-walled structural portion 65 at that end 82. With increasing distance away from the end 82, apertures 50 and 51 define an additional thin-walled structural portion 64 therebetween. The central aperture 54 is a U-shaped elongated aperture 54 that, along with aperture 51, defines a thin-walled structural portion 63. Similarly, elongated apertures 54 and 52 define a thin-walled structural portion 62, apertures 53 and 51 similarly define a thin-walled structural portion 61, and aperture 53 defines at least in part a thin-walled structural portion 60 at the other end 80 of the structural member 32.

With continued reference to FIGS. 4 and 5, apertures 50, 51, 52, 53 are generally rectangular shaped with rounded corners, but may be shaped differently in other embodiments, such as an oval shaped aperture. Similarly, in the shown embodiment, the elongated aperture 54 is U-shaped, but may be shaped differently in other embodiments, such as an I-shaped, or dog-bone shaped aperture. Further, the elongated aperture 54 may extend between opposing sides 84, 86 of the structural member 32 and may have a central elongated portion that is oriented generally parallel to an end surface 88 of the structural member 32. Although the example embodiment of the load cell 30 includes a series of three thin-walled structural portions 60-62, 63-65 at each of opposing ends 80, 82 thereof, it is appreciated that in other embodiments, more or fewer apertures and associated thin-walled structural portions may be provided. Advantageously, the apertures and associated thin-walled structural portions define parallel planar mounting surfaces upon which to mount strain gauges in accordance with the various embodiments described herein.

More particularly, with continued reference to FIGS. 4 and 5, each thin-walled structural portion 60-65 may define or provide a pair of respective offset horizontal strain gauge mounting surfaces, S1-S14, that are generally parallel to each other and a horizontal reference plane $P_H$ of the load cell 30. For example, thin-walled structural portion 65 defines offset horizontal strain gauge mounting surfaces S13 and S1. In this manner, each of the thin-walled structural portions 60-65 may be provided with a series of planar surfaces S1-S14 that are suitable to receive strain gauges in accordance with the various embodiments described herein.

With continued reference to FIGS. 4 and 5, each load cell 30 may further include a plurality of strain gauges (not shown), and wherein, for each load cell 30, at least some of the strain gauges may be located on one or more of the thin-walled structural portions 63-65 defined by the apertures 50, 51, and 54 and thin-walled structural portions 60-62 defined by the apertures 52-54. For example, a first bridge arrangement of four strain gauges may be attached to the offset horizontal strain gauge mounting surfaces S2 and S11 of the load cell 30, as indicated by locations labeled T2, C2, C11, T11, and a second bridge arrangement of strain gauges may be attached to the horizontal mounting surfaces S5 and S8 of the load cell 30, as indicated by the locations labeled C5, T5, T8, C8, as shown in FIG. 5. The strain gauges located at positions T2, T5, T8, T11 may be placed in tension by the applied load of the waste bins and the strain gauges located at positions C2, C5, C8, C11 may be placed in compression by the applied load of the waste bins. The strain gauges at locations T2, C2, C11, T11 on surfaces S2 and S11 may be electrically connected in a Wheatstone bridge configuration to collectively generate a signal indicative of a portion of the load carried by the load cell 30 during operation. Similarly, the strain gauges at locations C5, T5, T8, C8 on surfaces S5 and S8 may be electrically connected in a Wheatstone bridge configuration to collectively generate a signal indicative of a portion of the load carried by the load cell 30 during operation. The signal generated by the first bridge arrangement may be combined or analyzed together with a signal generated by the second bridge arrangement. Still further, the signals generated by the bridge arrangements of a plurality of load cells 30 may be combined or analyzed together to generate a combined load signal indicative of the applied load of the waste bins during operation.

Advantageously, the strain gauges of each bridge arrangement may be configured such that the load cell 30 is substantially insensitive to the positioning of the waste bins during a handling operation. For instance, to measure the weight of the waste bins during a lift and dispose operation, the moment arm of the lift system may vary as the waste bin is retracted and possibly tilted to dispose of its contents. In addition, the lift system may engage and pick up a load with the load located at different positions along the length of the lift members thereof. To account for the variable bending loads and other end loads in such circumstances, the first bridge arrangement may be arranged such that it experiences a signal increase as the moment arm of the lifting arm system 110 increases and the second bridge arrangement may be arranged such that it experiences a signal decrease as the moment arm of the lifting arm system 110 increases. The strain gauges of each bridge arrangement may be positioned such that a magnitude of the signal increase exhibited by the first bridge arrangement is about equal to a magnitude of the corresponding signal decrease exhibited by the second bridge arrangement such that a summation of the magnitudes of the signals of the bridge arrangements remains generally constant with changing position of the applied loads of the waste bins. In some instances, a scale factor or other calibration adjustment may be applied to one or more of the signals such that the summation of the magnitudes of the signals of the bridge arrangements remains generally constant with changing position of the load. The locations T2, C2, C11, T11 and C5, T5, T8, C8 of FIG. 3 illustrate one example of strain gauge locations that exhibit the features and functionality described above to a suitable degree of accuracy.

In some instances, the summation of the magnitudes of the signals of the bridge arrangements may deviate slightly with changing position of the load relative to the load cells 30. For example, in some configurations a generally constant summation may be obtained with changing position of the load nearest to the load cells 30 and farthest from the load cells 30 with an intermediate range characterized by slight deviations such that the response throughout all load positions bows slightly from a straight line response. In such instances, it is advantageous to apply a correction factor or other adjustments to the readings based on load position to compensate for the non-linear response and obtain greater accuracy of load measurements. According to some embodiments, this may be achieved by taking a ratio of the separate bridge readings, which may increase substantially linearly as the distance of the center of gravity of the load increases from the load cells 30, to determine the position of the load relative load cells 30 with reasonable accuracy (e.g., within inches of the actual position of the center of gravity of the load). Knowing the center of gravity or approximate center of gravity of the load, it is then possible to adjust or correct the aforementioned non-linear response based on said load position. For example, a lookup table which correlates the load position to an appropriate corrective factor based on empirical data may be used to adjust or correct the aforementioned non-linear response. Moreover, this correction can be made automatically using an onboard computing system, which is not shown or described in further detail to avoid unnecessarily obscuring descriptions of the embodiments.

While knowing the center of gravity or approximate center of gravity is advantageous for enabling the functionality described above, it may also be beneficial to know the center of gravity or approximate center of gravity so that the capacity of the lift system can be de-rated appropriately as the position of the center of gravity of the load increases and results in a greater moment applied to the lifting structure. In some instances, for example, the scale system 10 may automatically disable lifting of a load when the center of gravity of the load is located such that it causes the load desired to be lifted to exceed the rated capacity of the lift system at that particular center of gravity position. For this purpose, the scale system 10 may be communicatively coupled to a control system of the waste bin collection truck or other host lifting system to disable lifting functionality, such as, for example, by disabling or limiting the movement of the lift system. An audible alarm, warning light or other indication may be provided when the load at a given center of gravity position exceeds the rated load at that position. Additionally, the control system of the waste bin collection truck or other host vehicle or system may evaluate the position of the center of gravity of the load and the magnitude of the load in conjunction with one or more other signals or data indicative of the height and/or angle of the elevated bin or other lifted item to determine whether it is safe to operate the waste bin collection truck or other host vehicle or system under such conditions. Lifting, tilting or other movement of the lift members may be disabled or limited when exceeding a rated load or deviating from a predetermined safe operation condition.

With continued reference to FIGS. 4 and 5, the first bridge arrangement of strain gauges may include a set or pair of strain gauges located on horizontal mounting surfaces S2 and S11 at locations T2, C2 and C11, T11, respectively. The second bridge arrangement of strain gauges may include a set or pair of strain gauges located on horizontal mounting surfaces S5 and S8 at locations C5, T5 and T8, C8, respectively. The set of strain gauges of the first bridge arrangement at locations T2, C2 at one end 82 of the structural member 32 may be positioned generally opposite the set of strain gauges of the second bridge arrangement at locations C5, T5 at the same end 82. Similarly, at the other end 80, the set of strain gauges of the first bridge arrangement at locations C11, T11 may be positioned generally opposite the set of strain gauges of the second bridge arrangement at locations T8, C8. The set of strain gauges of the first bridge arrangement at locations T2, C2 may be located further away from the central horizontal reference plane $P_H$ of the load cell 30 than the set of strain gauges of the second bridge arrangement at locations C5, T5 and a spread $Sp_1$ of the set of strain gauges of the first bridge arrangement at locations T2, C2 may be greater than a spread $Sp_2$ of the set of strain gauges of the second bridge arrangement at locations C5, T5. Similarly, as it can be appreciated that the arrangement of locations T2, C2, C5, T5 described with respect to end 82 of the load cell 30 may also apply directly to the other end 80 of the load cell 30 such the arrangement of strain gauge locations of the first and the second bridge arrangements are symmetric or generally symmetric about a plane of symmetry. Further, the difference in spread or lateral offset between the sets of strain gauges may be determined experimentally to arrive at a suitable value that results in bridge arrangements that generally counteract sensitivities in each other to form a load cell that is particularly insensitive to changes in load position.

In some embodiments, the strain gauges of the first and the second bridge arrangements may be arranged such that a load value indicative of the applied load is maintained below a threshold accuracy of about 0.5 percent irrespective of the moment arm. In other embodiments, the threshold accuracy may be better than 0.1 percent. To assist in achieving the highest levels of accuracy, a supplemental bridge arrangement may be established between the opposing ends 80, 82 of the structural member 32 to generate a supplemental signal that is indicative of the moment placed on the load cell during handling of waste bins. This supplemental bridge arrangement may be configured to be particularly sensitive to the moment arm of the lift system such that corrective adjustment may be made to the load signal generated by the load cells 30. In some embodiments, the supplemental bridge arrangement of strain gauges may include a first and a second set of strain gauges located on opposing sides of the central horizontal reference plane $P_H$ of load cell 30 and located on opposing sides of a vertical reference plane $P_V$ of the load cell 30.

In other instances, the first and the second bridge arrangements may be used to generate a signal that is indicative of the moment placed on the load cells 30 by the load on the lift members to determine the position of the center of gravity of the load with reasonable accuracy. For example, as discussed earlier, this may be achieved by taking a ratio of the bridge readings, which increase substantially linearly as the distance of the center of gravity of the load increases from the load cells 30, to determine the position of the load relative to the load cells 30. The load position data can then be used to apply corrective adjustment to the load signal(s) generated by the load cells 30 via an onboard computing system, which again is not shown or described in further detail to avoid unnecessarily obscuring descriptions of the embodiments.

Figure 6:
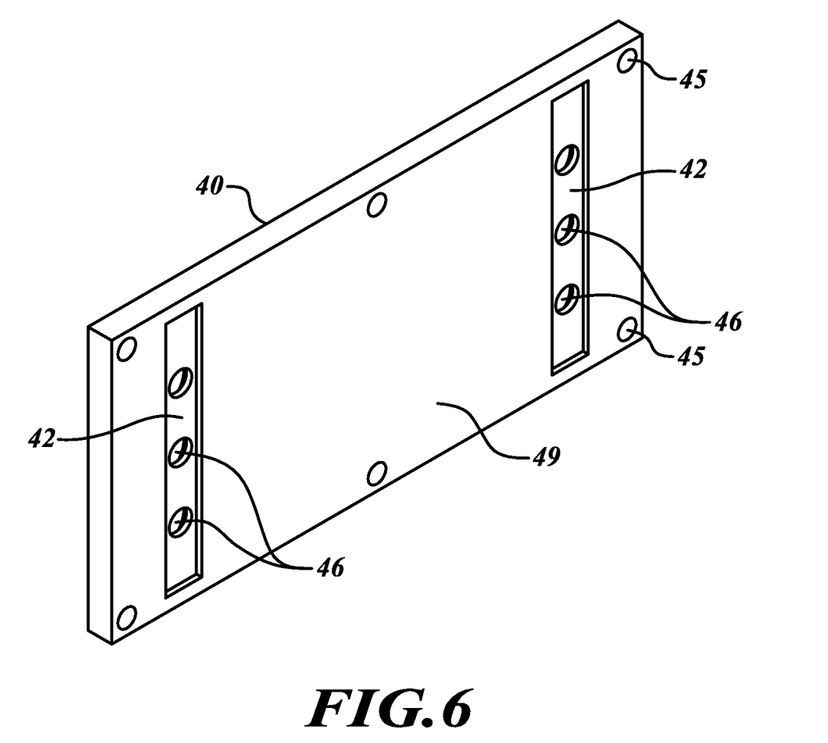
FIG. 6 is an isometric view of a lift support system of the scale of FIG. 1.

FIG. 6 illustrates a lift support member 40, according to one embodiment, that forms a portion of the scale system 10. An opposite side of the lift support member 40 can be seen in FIG. 1 and the exploded view of FIG. 2. The lift support member 40 includes a lift support plate 49 having a pair of lift support recesses 42 to insertably receive therein the structural member 32 of the load cell 30. In this manner, the load cells 30 may nest with the lift support plate 49 such that all or a substantial portion of the cantilevered load can be supported by an upper surface S13 of each load cell. This can relieve the shear stress off a series of fasteners 47 (FIGS. 1 and 2) that may be used to keep the load cells 30 in position. In this regard, the lift support plate 49 may include a plurality of apertures 46 extending therethrough to allow coupling of the load cell 30 to the lift support member 40 via the threaded fasteners 47 or the like. The threaded fasteners 47 may engage corresponding threaded apertures 85 in the structural members 32 of the load cells 30. The lift support plate 49 also includes a plurality of apertures 45 extending therethrough to allow coupling of lift members or other lifting devices to the base plate 20 of the scale system 10. As indicated above, the apertures 45 or other features may replicate features of the mounting plate 120 to accept the lift members in the same or similar manner that the mounting plate 120 would otherwise receive lift members in the absence of the example scale system 10. The lift support plate 49 may also be configured to allow a fastener head of the fasteners 47 to sit flush with an external surface 48 of the lift support plate 49 or otherwise not protrude from the lift support plate 49 through application of countersinks or counterbores in the lift support plate 49, as shown best in FIGS. 1 and 2.

Figure 7:
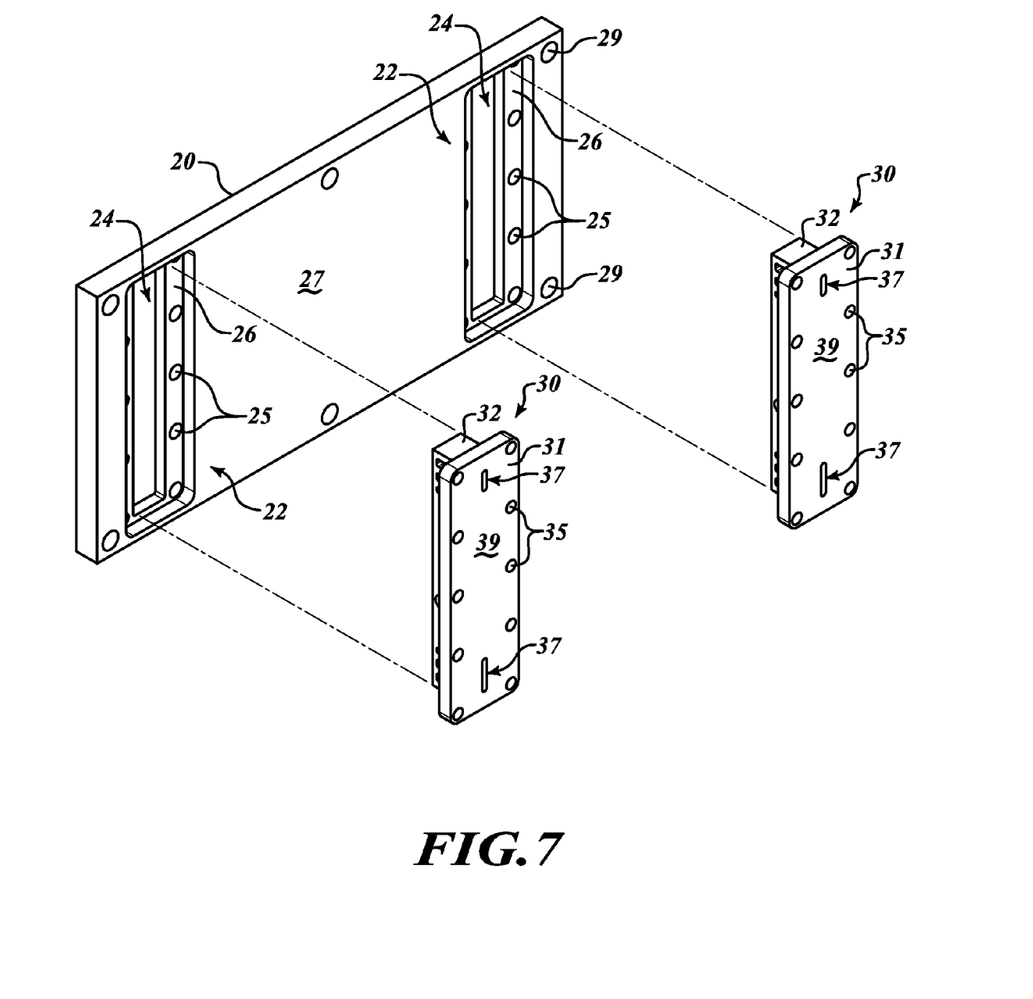
FIG. 7 is an isometric view of the base plate and load cells of the scale of FIG. 1.

FIG. 7 illustrates a base plate 20 of the scale system 10, according to one embodiment. The other side of the base plate 20 can be seen in the exploded view of FIG. 2. With reference to FIG. 7, the base plate 20 includes a pair of load cell receiving cavities 22 formed therein. Each load cell receiving cavity 22 includes an opening 24 configured to receive therethrough the structural member 32 of a respective load cell 30. Further, each load cell cavity 22 includes a base flange recess 26 adapted to receive therein the base flange 31 of the respective load cell 30. The depth of the base flange recess 26 may be configured such that upon receipt of the base flange 31, a rear surface 39 of the base flange 31 sits about flush with an outer surface 27 of the base plate 20. The base flange recess 26 may include a plurality of apertures 25 through which to pass fasteners 89 for engaging corresponding threaded apertures 87 in the base flange 31 of the load cells 30 and fastening the load cells 30 rigidly to the base plate 20. The base plate 20 may also include a plurality of apertures 29 extending therethrough to allow coupling of the load cell 30 and the base plate 20 to the lift support member 40 via additional threaded fasteners 123 (FIG. 2) or other fastening devices. The apertures 29 of the base plate 20 may be arranged and located to correspond to the mounting arrangement of threaded apertures 122 on the mounting plate 120 such that the scale system 10 may be installed directly to the mounting plate 120 as an intermediary between the mounting plate 120 and lift members of an otherwise conventional waste bin collection truck, for example.

FIG. 1 illustrates the waste bin scale system 10 fitted with a protective skirt system 70. The protective skirt system 70 may include two pairs of opposing plates 71, 72 and 73, 74 that form a perimeter around the waste bin scale system 10. The protective skirt system 70 may be formed as an integral piece, or by welding or fastening the plates 71-74, together to form a perimeter. A rubber gasket or seal (not shown) may also be attached to the skirt plates 71-74 and span a gap between the skirt system 70 and adjacent components. The gasket or seal preferably has a rigidity that enables it to effectively keep out debris while remaining pliable enough so that it does not bear a significant load. In this manner, the perimeter formed by the protective skirt system 70 may be configured such that internal components of the waste bin scale system 10 are encompassed or enclosed within the protective skirt system 70, base plate 20 and lift support member 40, thereby preventing debris from contacting the load cells 30 or otherwise effecting the performance of the load cells 30.

Figure 8:
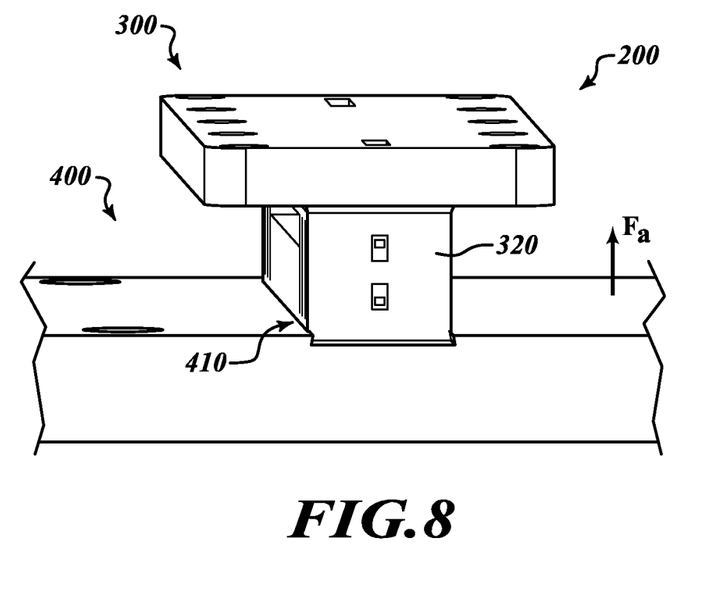
FIG. 8 is a partial perspective view of a waste bin scale, according to an alternative embodiment.

FIG. 8 illustrates an alternative example embodiment of a waste bin scale system 200. In the alternative example embodiment of the waste bin scale system 200, a structural member 320 of a load cell 300 is coupled to a lift support member 400 via a dovetail joint 410. Coupling in such a manner permits any axial loads along the direction of force vector Fa to be reacted by the dovetail joint 410, while any fasteners that may form a connection between the load cell 300 and the lift support member 400 will only provide a secondary load path in case of a failure of the dovetail joint 410. Advantageously, a configuration in this manner provides multiple load paths, which result in a robust joint and provide for easy installation and removal. Additionally, the dovetail joint 410 relieves all or a substantial portion of the tensile loads on fasteners that are preferably used to keep the load cell 300 in position.

Figure 9:
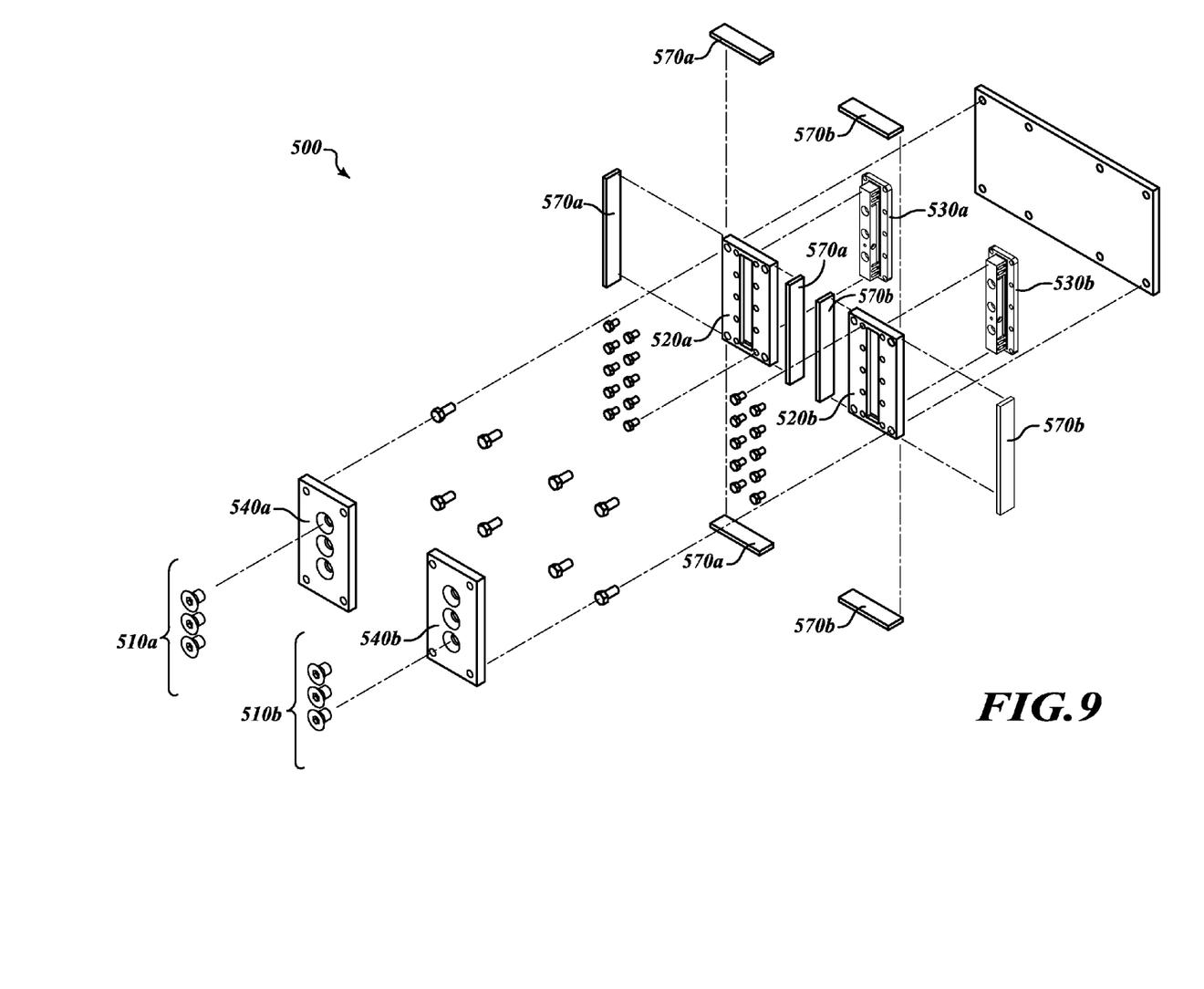
FIG. 9 is an exploded isometric view of a waste bin scale according to another embodiment, along with a mounting plate of the lifting arm system.

FIG. 9 illustrates yet a further example embodiment of a waste bin scale system 500, wherein a system similar to the example waste bin scale system 10 shown in FIG. 2, for example, is bifurcated into adjacent scale units 510a, 510b. As will be readily apparent to those of ordinary skill in the relevant art, the separate scale units 510a, 510b may be configured to collectively measure a cantilevered load. Each scale unit may include a base 520a, 520b coupleable to a lift system; a lift member support 540a, 540b adapted to support a pair of lift members or other lifting structures; and a load cell 530a, 530b coupled between the base 520a, 520b and the lift member support system 540a, 540b. Separate skirt systems 570a, 570b may also be provided for each scale unit 510a, 510b. The construction of each scale unit 510a, 510b may otherwise be the same or similar to the other waste bin scale systems 10, 200 described herein.

In accordance with the embodiments of the load cells and scale systems described herein, related methods of measuring a load carried by one or more lift members are also provided. For instance, in some embodiments, a method of measuring a load carried by a pair of lift members of a lift system configured to movably position the lift members may be provided which includes: obtaining signals from an arrangement of strain gauges of each of a plurality of load cells that are positioned between the lift system and the lift members, wherein obtaining signals from each load cell includes obtaining, for each load cell, strain gauge signals from a respective first bridge arrangement of strain gauges mounted on parallel horizontal mounting surfaces located at each end of opposing ends of the load cell and obtaining strain gauge signals from a respective second bridge arrangement of strain gauges mounted on parallel mounting surfaces located at each of the opposing ends of the load cell; and processing the signals to obtain a load value indicative of a load shared by the pair of lift members.

The first bridge arrangement of strain gauges may include a first set of strain gauges located on one of the parallel offset horizontal mounting surfaces at an upper end of the load cell and a second set of strain gauges located on one of the parallel offset horizontal mounting surfaces at a lower end of the load cell, and the second bridge arrangement of strain gauges may include a first set of strain gauges located on another one of the parallel offset horizontal mounting surfaces at an upper end of the load cell and a second set of strain gauges located on another one of the parallel offset horizontal mounting surfaces at a lower end of the load cell, and a spread of the first set of strain gauges of the first bridge arrangement may be greater than a spread of the first set of strain gauges of the second bridge arrangement.

The strain gauges may be arranged such that the load value indicative of the load shared by the pair of lift members is maintained below a threshold accuracy of about 0.5 percent irrespective of a position of the load along a length of the lift members. For each load cell, the first bridge arrangement of strain gauges may exhibit a signal increase when the load is positioned on the lift members with increasing distance from the load cell and the second bridge arrangement of strain gauges may exhibit a signal decrease when the load is positioned on the lift members with increasing distance from the load cell. A magnitude of the signal increase exhibited by the first bridge arrangement of strain gauges when the load is positioned on the lift members with increasing distance from the load cell may be about equal to a magnitude of the corresponding signal decrease exhibited by the second bridge arrangement of strain gauges such that a summation of the magnitudes of the signals of the first and the second bridge arrangement of strain gauges remains generally constant with changing position of the load along the lift members.

The method may further include determining a position of the load carried by the pair of lift members using the strain gauge signals from the load cells; and adjusting the load value indicative of the load shared by the pair of lift members based on said determined position. Determining the position of the load may include using the strain gauge signals from the first bridge arrangement and the second bridge arrangement. In other instances, the method may include obtaining, for each load cell, a supplemental signal from a third bridge arrangement of strain gauges. In such embodiments, the third bridge arrangement may comprise a first and a second set of strain gauges located on opposing sides of a central horizontal reference plane of the load cell and located on opposing sides of a vertical reference plane of the load cell that is generally parallel to a mounting face thereof. It is appreciated, however, that a wide variety of strain gauge positions and orientations may be used in connection with the methods and scale systems described herein.

Although the embodiments shown and described herein have been discussed in the context of use with waste bin collections trucks, it is appreciated that embodiments of the scales, load cells and related methods disclosed herein may be suitable for a wide range of equipment that is configured to manipulate a cantilevered load using lift members of other lift devices. For example, embodiments described herein may be applied to forklifts, telehandlers and other lift machinery.

Moreover, aspects of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Application Ser. No. 61/800,773 filed Mar. 15, 2013, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A scale to measure a cantilevered load carried by lift members of a lift system, the scale comprising:
   a base coupleable to the lift system;
   a lift member support system; and
   a plurality of load cells coupled between the base and the lift member support system, each load cell comprising:
      an elongated, vertically oriented structural member having an elongated, vertically oriented aperture extending through an entirety of a width thereof which defines at least one pair of offset strain gauge mounting surfaces that are parallel to a horizontal reference plane; and
      an arrangement of strain gauges to sense deformations at least at one or more locations on the at least one pair of offset strain gauge mounting surfaces,
   wherein the elongated, vertically oriented structural member of each load cell further comprises a transverse base flange, the load cell being coupled to the base via the transverse base flange, and
   wherein the elongated, vertically oriented structural member of each load cell further comprises a vertically extending dove tail structure, the load cell being coupled to the lift member support system via the vertically extending dove tail structure.

2. The scale of claim 1 wherein the lift system is a portion of a waste bin collection vehicle, and wherein the cantilevered load is a waste bin.

3. The scale of claim 1 wherein, for each load cell, the elongated, vertically oriented aperture defines an upper strain gauge mounting surface and a lower strain gauge mounting surface that are each parallel to the horizontal reference plane.

4. The scale of claim 1 wherein the elongated, vertically oriented aperture is U-shaped or I-shaped.

5. The scale of claim 1 wherein, for each load cell, the elongated, vertically oriented aperture defines at least one thin-walled structural portion adjacent to the elongated, vertically oriented aperture.

6. The scale of claim 1 wherein the structural member of each load cell includes at least one thin-walled structural portion with opposing surfaces that are generally parallel to the horizontal reference plane.

7. The scale of claim 1 wherein the structural member of each load cell includes a plurality of distinct apertures extending through a width therewith in series to define at least one thin-walled structural portion between the apertures.

8. The scale of claim 1 wherein the lift member support system includes a plurality of load cell cavities for insertably receiving the vertically extending dove tail structure of a respective one of the plurality of load cells.

9. The scale of claim 1 wherein the lift member support system bears on an upper surface of each load cell during operation.

10. The scale of claim 1 wherein the lift member support system is configured to support at least two lift members for lifting waste bins in a cantilevered manner.

11. The scale of claim 1, further comprising:
   a protective skirt to assist in preventing debris from contacting the load cells during use.

12. The scale of claim 1, further comprising, for each load cell:
   a first bridge arrangement of strain gauges including one pair of strain gauges mounted on one of the parallel offset mounting surfaces located at one of opposing ends of the load cell and including one pair of strain gauges mounted on one of the parallel offset mounting surfaces located at the other one of the opposing ends of the load cell; and
   a second bridge arrangement of strain gauges including one pair of strain gauges mounted on one of the parallel offset mounting surfaces located at one of the opposing ends of the load cell and one pair of strain gauges mounted on one of the parallel offset mounting surfaces located at the other one of the opposing ends of the load cell.

13. The scale of claim 12 wherein the first bridge arrangement of strain gauges includes a first set of strain gauges located on one of parallel offset mounting surfaces at an upper end of the structural member and a second set of strain gauges located on one of parallel offset mounting surfaces at a lower end of the structural member, and wherein the second bridge arrangement of strain gauges includes a first set of strain gauges located on one of parallel offset mounting surfaces at the upper end of the structural member and a second set of strain gauges located on one of parallel offset mounting surfaces at the lower end of the structural member.

14. The scale of claim 13 wherein at least some of the strain gauges of the first bridge arrangement are positioned generally opposite of corresponding strain gauges of the second bridge arrangement.

15. The scale of claim 13 wherein the first set of strain gauges of the first bridge arrangement is located further away from the horizontal reference plane of the load cell than the first set of strain gauges of the second bridge arrangement, and wherein a spread of the first set of strain gauges of the first bridge arrangement is greater than a spread of the first set of strain gauges of the second bridge arrangement.

16. The scale of claim 15 wherein each of the first set of strain gauges of each of the first and the second bridge arrangements includes one strain gauge arranged to be placed in tension during use and one strain gauge arranged to be placed in compression during use.

17. The scale of claim 12 wherein the aperture defines an upper strain gauge mounting surface and a lower strain gauge mounting surface that each include a surface generally directed toward each other.

18. The scale of claim 12 wherein the structural member of each load cell includes a plurality of distinct apertures extending through a width therewith in series to define at least one thin-walled structural portion between the apertures.

19. The scale of claim 12 wherein the first bridge arrangement of strain gauges exhibits a signal increase when the load is positioned on forks with increasing distance from the load cell and the second bridge arrangement of strain gauges exhibits a signal decrease when the load is positioned on the forks with increasing distance from the load cell.

20. The scale of claim 19 wherein the arrangement of strain gauges is configured such that a magnitude of the signal increase exhibited by the first bridge arrangement when the load is positioned on the forks with increasing distance from the load cell is about equal to a magnitude of the corresponding signal decrease exhibited by the second bridge arrangement such that a summation of the magnitudes of the signals of the first and second bridge arrangements remains generally constant with changing position of the load along the forks.

* * * * *